Aug. 9, 1932.                L. F. PERKETT                1,871,277
                               HUMIDIFIER
                         Filed July 2, 1931         2 Sheets-Sheet 1
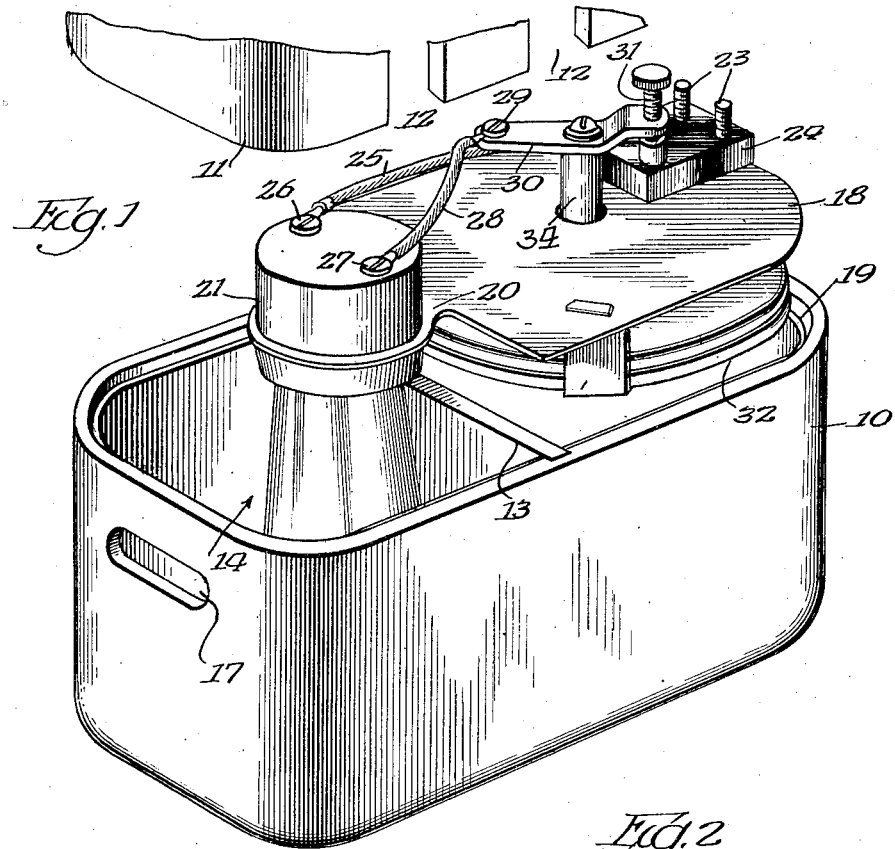
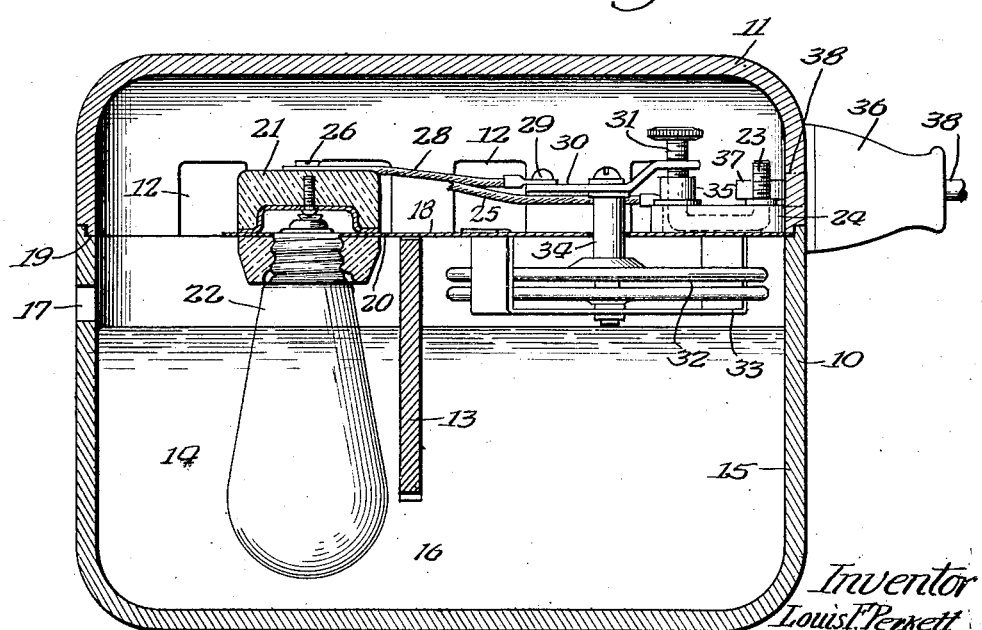
Inventor
Louis F. Perkett Aug. 9, 1932. L. F. PERKETT 1,871,277
HUMIDIFIER
Filed July 2, 1931 2 Sheets-Sheet 2
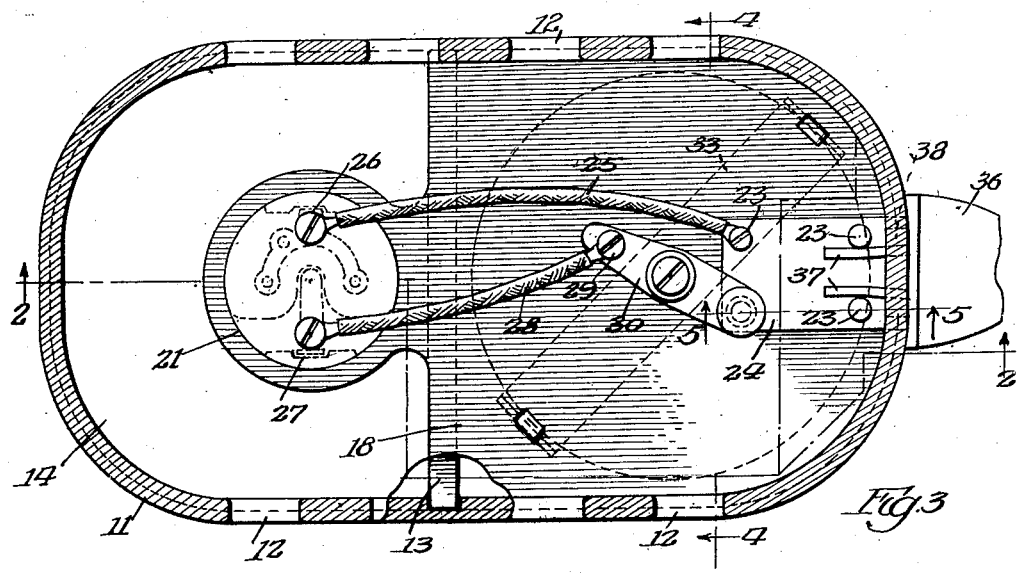
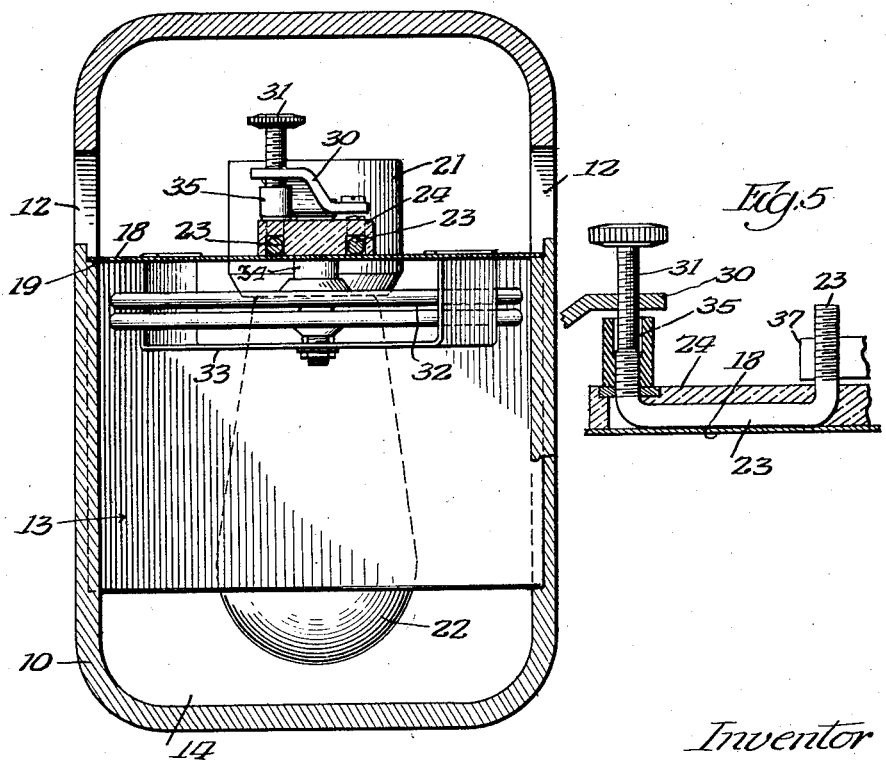
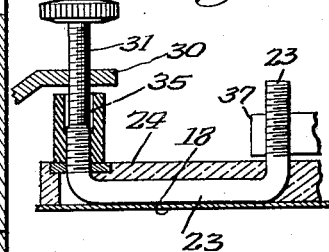
Inventor
Louis F. Perkett
By Patented Aug. 9, 1932

1,871,277

UNITED STATES PATENT OFFICE

LOUIS F. PERKETT, OF TRAVERSE CITY, MICHIGAN

HUMIDIFIER

Application filed July 2, 1931. Serial No. 548,370.

This invention relates to improvements in humidifiers for humidifying the atmosphere, and is particularly adapted, though not necessarily limited in its use in show cases and the like, and one of the objects of the invention is to provide an improved device of this character embodying a container for holding liquid, such as water, a lamp for heating the water, and improved means whereby the temperature of the liquid will thermostatically control the igniting and extinguishing of the light.

A further object is to provide an improved device of this character embodying a casing, a portion of which may be of translucent material and upon which portion may be arranged advertising or any other suitable matter which will be intermittently illuminated to attract attention, by the lighting and extinguishing of the lamp.

A further object is to provide an improved device of this character embodying a casing in which the liquid is arranged, and a lamp and thermostatic control means, and which lamp and control means are mounted upon a suitable support adapted to be inserted and removed from the casing as a unitary structure.

To the attainment of these ends and the accomplishment of other new and useful objects as will appear, the invention consists in the features of novelty in substantially the construction, combination and arrangement of the several parts, hereinafter more fully described and claimed and as shown in the accompanying drawings illustrating this invention, and in which, Figure 1 is a perspective view of a device of this character constructed in accordance with the principles of this invention, with parts omitted and showing the parts of the device separated.

Figure 2 is an irregular vertical sectional view taken on line 2—2 of Figure 3.

Figure 3 is a view partly in top plan, partly in horizontal section, and partly broken away, with parts omitted.

Figure 4 is a sectional view taken on line 4—4 of Figure 3.

Figure 5 is a detailed sectional view taken on line 5—5 of Figure 3, on an enlarged scale.

Referring more particularly to the drawings the device consists essentially of a casing 10 constructed of a desired material and of any suitable size, and is provided with a removable closure constructed of any suitable translucent material. The closure is provided with openings 12 preferably adjacent the bottom thereof, to be closed by the upper edge of the casing when the closure is in position, and through which openings moist air will pass.

Arranged within the casing 10, and removably held in position to extend across the casing, is an upright partition 13 which divides the casing into two compartments 14—15, and the partition 13 preferably terminates short of the bottom of the casing to form a communicating passage between the compartments 14 and 15.

The casing may also be provided with one or more openings 17 to regulate a water line, and also to permit air to enter the casing.

The numeral 18 designates generally a support which is preferably in the form of a suitable sheet material adapted when in position, to rest within the casing 10 upon a supporting shoulder 19. The support 18 may, if desired, be provided with a reduced portion 20 and a portion of the support, when in position, will stand over the compartment 15, while the reduced portion 20 will project over the compartment 14. The reduced portion 20 has connected with it a socket 21 for the reception of an electric lamp bulb 22. The socket 21 is so arranged that when the support 18 is in position the lamp 22 will be disposed within the compartment 14, to one side of the partition 13 so as to project into the water or liquid.

Carried by the support 18, and spaced from the socket 21, are contact terminals 23 preferably of a U-shape formation supported by a block of insulating material 24. To one end of one of the contacts 23 is connected a conductor 25, the other end of which is connected to a terminal 26 of the lamp socket. To the other terminal 27 of the lamp socket is connected a conductor 28, which in turn is connected to a binding post or terminal 29 carried by a make-and-break device 30. An adjustable terminal or screw 31 is carried by the make-and-break device 30, and which terminal is adapted to be moved into and out of engagement with one end of the other contact terminal 23.

Carried by the support 18 is a thermostatic control device 32, preferably in the form of expansible and contractable disks held in position with respect to the support 18 in any suitable manner, such as by means of a supporting bracket 33. Connected to the disks 32 is an upright 34 which passes through the support 18 and has secured to it the make-and-break device 30, so that when the disks 32 expand and contract, the make-and-break device will be moved so as to cause the terminal 31 to be moved into and out of engagement with the end of one of the contact terminals 23, to light and extinguish the lamp 22 and, as the operation of the thermostatic disks 32 is controlled by the temperature of the liquid, and the air within the casing 10, it will be manifest that the light will be intermittently and automatically lighted and extinguished, thereby causing a flash, the duration of which and the frequency thereof is controlled by the temperature conditions within the casing. Obviously the upright 34, the thermostatic device 32 and the support 33 will be suitably insulated with respect to each other and with respect to the support 18.

In order to protect the points of contact of the terminal 30 and the end of the terminal 23 there is provided a sleeve 35 of insulating material which is threaded onto the end of the terminal contact 23, and is of a length to project beyond the end of such contact to form a socket within which the end of the terminal 31 projects and moves upwardly and downwardly therein under the action of the contraction and expansion of the thermostatic control device 32. The numeral 36 designates a service plug having terminals 37 secured thereto in the usual manner, and this plug 36 is connected to a conductor 38 leading from the source of supply of the electric current. The contacts 31 and 23 are formed of suitable noncorrosive material so that they will not burn out or get out of order.

The closure 11 of the casing is provided with an opening 38 through which the terminals 37 of the plug 36 are adapted to be inserted and to be positioned between the ends of the contacts 23, to form an electrical connection between the lamp and the source of supply of current.

With this invention it will be manifest that there is provided a simple and compact device which will not only humidify the atmosphere but the device may be employed as a flash sign, in as much as advertising or other matter may be placed upon the translucent closure 11, and by the flashing of the lamp, a very attractive advertising device will be produced.

It will also be manifest that the closure 11 may be removed either while the plug 36 is in position or out of position so that access may be had to the interior of the case.

Furthermore, the support 18 together with the lamp socket, the make-and-break device, as well as the thermostatic control means, constitute a single unitary structure and may be readily removed and applied with respect to the casing 10 as a unit.

It will also be manifest that the partition 13 serves as a means for protecting the thermostatic control disks 32, in that any air which may enter the casing 10 through the opening 17 will be prevented from striking the disks 32.

While the preferred form and invention has been herein shown and described, it is understood that various changes may be made in details of construction and in the combination and arrangement of the several parts, within the scope of the claims, without deducting from the principles of this invention, and it is also to be understood that thermostatic control means, other than the disk form, which is suitable for the purpose, may be employed.

What is claimed as new is:—

1. A humidifier of the character described embodying a casing, a horizontal support removably arranged in the casing and extending partially thereacross, a vertical partition within the casing beneath said support for dividing said casing into two chambers having communication adjacent the bottom of the partition, a lamp in one of the chambers and mounted upon said support, a thermostat for controlling the lamp and arranged in the outer chamber and mounted upon said support, a closure for the casing, and means whereby electrical connection may be made with the lamp, through a wall of the casing.

2. A humidifier of the character described embodying a casing, a horizontal support removably arranged in the casing and extending partially thereacross, a vertical partition within the casing beneath said support for dividing said casing into two chambers having communication adjacent the bottom of the partition, a lamp in one of the chambers and mounted upon said support, a thermostat for controlling the lamp and arranged in the outer chamber and mounted upon said support, a closure for the casing, and means whereby electrical connection may be made with the lamp, through a wall of the casing, said support, lamp and thermostat constituting a unitary structure and being removable from and insertable into the casing as a single unit.

3. A humidifier of the character described embodying a casing, a horizontal support removably arranged in the casing and extending in a direction thereacross, a vertical partition removably supported in the casing to divide the casing into two compartments, said partition terminating short of the bottom of the casing to form communication between the chambers, a lamp mounted upon said support and arranged in one of said compartments, a circuit for the lamp, means whereby a current supply line may be connected with said circuit from outside of the casing, a thermostat mounted upon said support and arranged in the other of said compartments, means responsive to the action of said thermostat for making and breaking the circuit to the lamp, and a closure for the casing.

4. A humidifier of the character described embodying a casing, a horizontal support removably arranged in the casing and extending in a direction thereacross, a vertical partition removably supported in the casing to divide the casing into two compartments, said partition terminating short of the bottom of the casing to form communication between the chambers, a lamp mounted upon said support and arranged in one of said compartments, a circuit for the lamp, means whereby a current supply line may be connected with said circuit from outside of the casing, a thermostat mounted upon said support and arranged in the other of said compartments, means responsive to the action of said thermostat for making and breaking the circuit to the lamp, a closure for the casing, said support and said lamp and thermostat and the means controlled by the thermostat being all bodily removable from and insertable into said casing as a single unit.

5. A humidifier of the character described embodying a casing, a removable upright partition in the casing for dividing the same into two compartments having communication with each other adjacent the bottom of the partition, a horizontal support removably arranged in the casing above said partition, a lamp mounted upon the support and extending into one of the compartments, electric conductors connected into the lamp, terminals also carried by the support to which the conductors are connected and to which terminals a service line plug is adapted to removably engage, a make-and-break device in the circuit formed by said conductors, expansible and contractable thermostat elements carried by said support and arranged in the other of said chambers for controlling the operation of said make-and-break device, said support, lamp, thermostat and make-and-break device being removable as a unit from the casing, and a closure for the casing.

6. A humidifier of the character described embodying a casing, a removable upright partition in the casing for dividing the same into two compartments having communication with each other adjacent the bottom of the partition, a horizontal support removably arranged in the casing above said partition, a lamp mounted upon the support and extending into one of the compartments, electric conductors connected with the lamp, terminals also carried by the support to which the conductors are connected and to which terminals a service line plug is adapted to removably engage, a make-and-break device in the circuit formed by said conductors, expansible and contractable thermostat elements carried by said support and arranged in the other of said chambers for controlling the operation of said make-and-break device, said support, lamp, thermostat and make-and-break device being removable as a unit from the casing, there being openings in the wall of the closure above the said support.

7. A humidifier of the character described embodying a casing, a removable upright partition in the casing for dividing the same into two compartments having communication with each other adjacent the bottom of the partition, a horizontal support removably arranged in the casing above said partition, a lamp mounted upon the support and extending into one of the compartments, electric conductors connected with the lamp, terminals also carried by the support to which the conductors are connected and to which terminals a service line plug is adapted to removably engage, a make-and-break device in the circuit formed by said conductors, expansible and contractable thermostat elements carried by said support and arranged in the other of said chamber for controlling the operation of said make-and-break device, said support, lamp, thermostat and make-and-break device being removable as a unit from the casing, and a closure of translucent material for the casing, there being openings in the wall of the closure above the said support.

8. A humidifier of the character described embodying a casing, a partition dividing the casing into two chambers, a support extending across the chamber above the partition, a lamp carried by the support and disposed in one of the chambers, a circuit for the lamp, a make-and-break device in the lamp circuit, a thermostat carried by the support for controlling the make-and-break device and arranged in the other of the chambers, said make-and-break devices embodying contacts movable into and out of engagement, and a protective sleeve encompassing one of the contacts and fixed with respect thereto and into which sleeve the other of the contacts telescopes for free movement with respect thereto.

In testimony whereof I have signed my name to this specification, on this 24th day of June, A. D. 1931.

LOUIS F. PERKETT.